No. 671,850. Patented Apr. 9, 1901.
R. WINCHEL.
DEVICE FOR HOLDING HORSES.
(Application filed Dec. 22, 1900.)
(No Model.) 2 Sheets—Sheet 1.
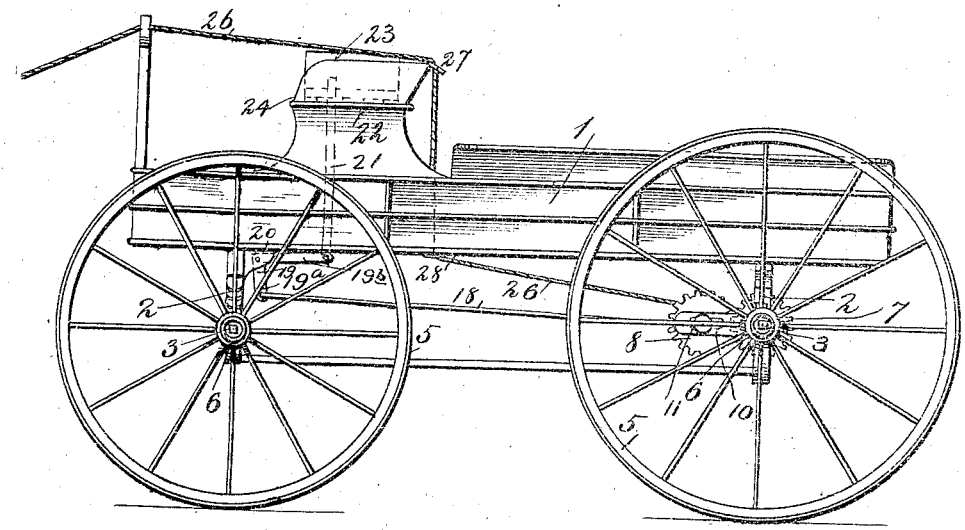
WITNESSES:
Franck L. Ourand.
F. G. Radelfinger.
INVENTOR
Rudolph Winchel
BY
Louis Bagger & Co.
ATTORNEYS.

No. 671,850. Patented Apr. 9, 1901.
R. WINCHEL.
DEVICE FOR HOLDING HORSES.
(Application filed Dec. 22, 1900.)
(No Model.) 2 Sheets—Sheet 2.
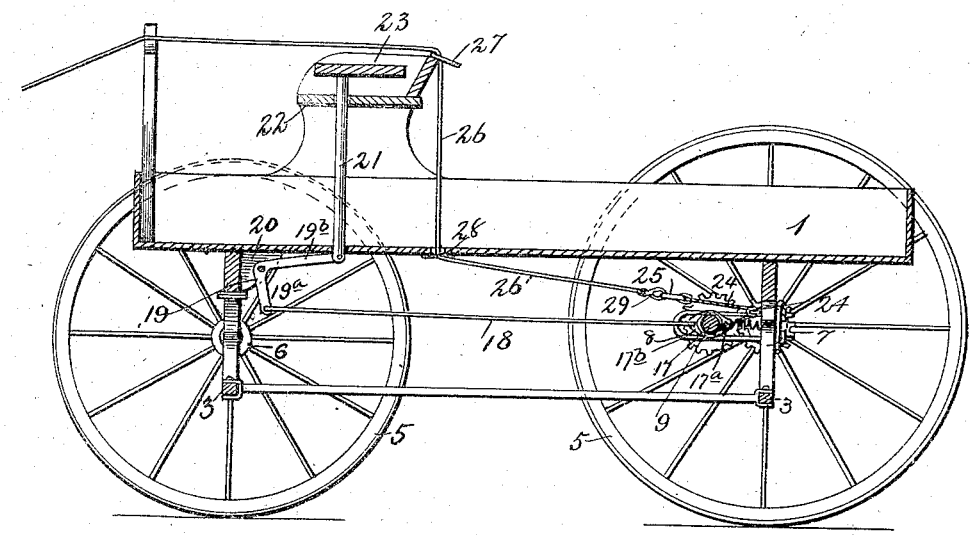
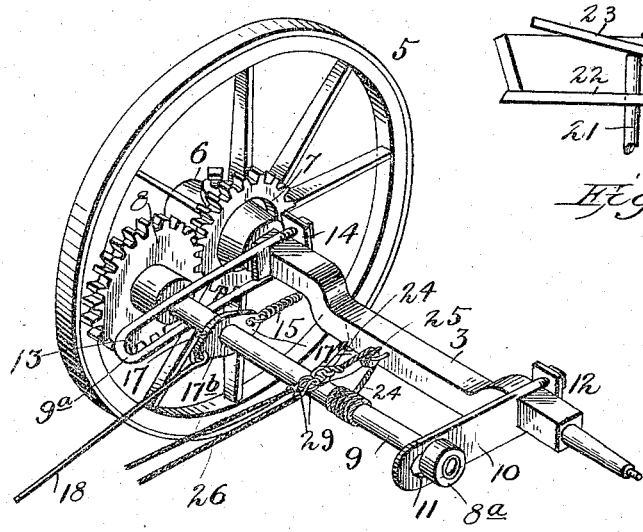
WITNESSES:
Franck L. Ourand.
T. G. Radelfinger.
INVENTOR.
Rudolph Winchel.
BY Louis Bagger & Co.,
ATTORNEYS.

UNITED STATES PATENT OFFICE.

RUDOLPH WINCHEL, OF WEBB CITY, MISSOURI.

DEVICE FOR HOLDING HORSES.

SPECIFICATION forming part of Letters Patent No. 671,850, dated April 9, 1901.

Application filed December 22, 1900. Serial No. 40,737. (No model.)

*To all whom it may concern:*

Be it known that I, RUDOLPH WINCHEL, a citizen of the United States, residing at Webb City, in the county of Jasper and State of Missouri, have invented new and useful Improvements in Devices for Holding Horses, of which the following is a specification.

My invention relates to a device for holding horses; and the object of the same is to produce an attachment for a wagon by which the most fractious horse can be quickly brought to a stop. It is impossible for a team hitched to a wagon equipped with my improvement to run away. They would be pulled up the instant the wagon got under way.

The novel construction devised by me for carrying out my invention is fully described in this specification and claimed and illustrated in the accompanying drawings, forming a part thereof, in which—

Figure 1 is a side elevation of a wagon with my device attached thereto. Fig. 2 is a vertical longitudinal section of the same. Fig. 3 is a perspective of the rear axle and the connected mechanism. Fig. 4 is a plan view of the under side of the wagon with a modified form of my device mounted thereon. Fig. 5 is a detail of the seat.

Like numerals of reference designate like parts wherever they occur in the different views of the drawings.

The numeral 1 designates the bed of a wagon, supported at the rear on springs 2. The springs 2 are seated on an axle 3, which is supported by wheels 5, having hubs 6. Rigidly mounted on one of the hubs 6 is a cogged gear-wheel 7. By this construction the gear 7 is compelled to turn in unison with the rear wheels 5. The gear 7 meshes with a gear 8, which is keyed on a shaft 9, extending parallel to the axle 3. The shaft 9 is provided with an enlargement 8$^a$ and is supported by means of a guide member 9$^a$ and an arm 10. The arm 10 is apertured at 11 to accommodate the shaft 9 and has a clip 12 formed integral therewith, which straddles the axle 3 and is clamped thereon. A slot 13 cuts the guide member 9$^a$ throughout the greater portion of its length, and the shaft 9 is mounted to slide therein. The guide-arm 9$^a$ is secured to the axle 3 in the same manner as the arm 10—that is, by a clip 14, formed integral therewith and straddling the axle. By this arrangement the gear-wheel 8 can be thrown in or out of engagement with the gear 7. In order to hold the two gears normally in engagement, a coiled spring 15 is provided, which is secured to the axle 3 at 16 and oppositely attached to an ear 17$^a$, formed integral with a ring 17, mounted on the shaft 9. The ring 17 has a second ear 17$^b$, to which is attached a connecting-rod 18 of the mechanism for throwing the gears out of engagement. This connecting-rod 18 is oppositely attached to one arm 19$^a$ of a bell-crank lever 19. The lever 19 is fulcrumed in a bracket 20, secured to the bed 1, and its other arm 19$^b$ is connected to a pusher or rod 21, which passes up and through an aperture in the bed and then through an aperture in the seat 22. The upper end of the rod normally projects about two inches above the bottom of the seat and a false bottom 23 bears on the top of it. This false bottom 23 is hinged at one end at 24 and extends the length of the seat. By virtue of the arrangement just described the gears normally mesh; but if the driver is upon the seat and seated on the false bottom 23 the pusher 21 is depressed and the gears disengaged by the action of the connecting mechanism. The shaft 9 is designed to also act as a drum and is therefore made of large size and hollow. It is conveniently formed from a piece of water or gas pipe. A rope 24 is secured to the shaft 9 and passes back through a pulley secured to axle 3 and then extends forward and is provided at its end with an eye or ring 25. In order to make my device effective, the lines 26 from the harness are passed through a guide 27, mounted on the back of the seat, and thence down and through an apertured guide 28, seated in an opening in the floor of the wagon-bed. The lines 26 are fitted at their extremes with snaps 29, which are engaged in the ring 25. The guides 27 and 28 may be conveniently made of glass plates or may be pulleys.

The operation of my invention can now be easily explained. The driver on stopping at a place and before leaving the wagon passes the lines 26 through the guides 27 and 28 and attaches the snaps on the ends thereof to the ring 25. He then leaves the seat, the pusher 21 is released, and the gears mesh.

If now the horses should start before the driver once more takes his seat, the shaft 9 would be actuated, the lines drawn taut, and the team stopped.

A modified form of my device is shown in Fig. 3. In this form a long shaft 30 is employed, which serves the same purpose as the shaft 9, and two gears 31 keyed thereon. The shaft 30 is mounted to slide in a pair of slotted guide-arms 32, spanning the axle and secured thereto. Two gears 33 are also employed, which gears are rigidly mounted on the hubs 6 and mesh with the gears 31. A pair of springs 34 hold the gears normally in engagement and two connecting-rods 18 connect the bell-crank lever to the shaft 30. The operation of this form of my device is the same as the other, but the four gears give more power than two.

I do not wish to be limited as to details of construction, as these may be modified in many particulars without departing from the spirit of my invention.

Having described my invention, what I claim as new, and wish to secure by Letters Patent, is—

1. In a device for holding horses, the combination, with a wagon, of a first gear rigidly mounted on the hub of one of the rear wheels of said wagon, a guide secured to the rear axle of said wagon, a shaft mounted in said guide, a gear keyed on said shaft and meshing with said first gear, an arm secured to the rear axle and having an aperture therein through which said shaft passes, a spring secured at one end to the rear axle and oppositely secured to the said shaft, and means for connecting the driving-lines to said shaft, and means for moving said shaft in said guide to disengage said gears, substantially as described.

2. In a device for holding horses, the combination, with a wagon, of a first gear rigidly mounted in the hub of one of the rear wheels of said wagon, a guide mounted on the rear axle of said wagon, a shaft bearing a gear located to mesh with said first gear, said shaft being mounted to slide in said guide, a ring on said shaft, a spring connected at one end to the rear axle of the wagon and at the other end to said ring, a bell-crank lever, a rod connecting said collar and one arm of said bell-crank lever, a pusher pivoted to the other arm of said bell-crank lever and extending up through the seat of the wagon, and a board hinged at one end to the seat and bearing on the top of said pusher-rod, substantially as described.

In testimony whereof I have hereunto set my hand in presence of two subscribing witnesses.

RUDOLPH WINCHEL.

Witnesses:
  GEO. B. SCOTT,
  E. T. ALTER.